Nov. 13, 1945.  M. REISS  2,388,869
PHOTOGRAPHIC OBJECTIVE
Filed Sept. 12, 1944
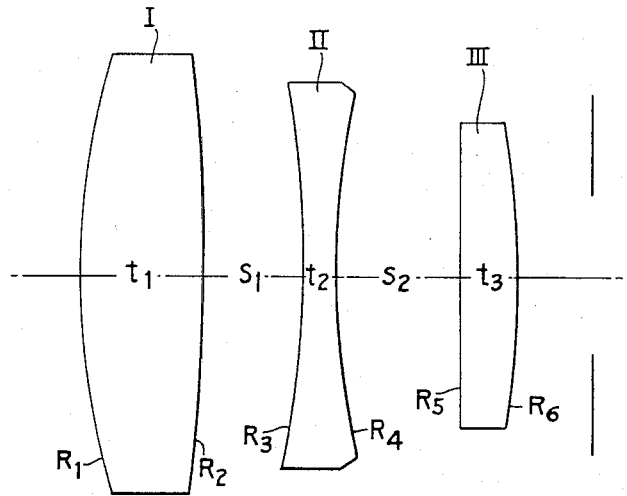
| EF = 100 mm. | | | | f/8 |
|---|---|---|---|---|
| LENS | $N_D$ | V | RADII | THICKNESSES |
| I | 1.611 | 58.8 | $R_1$ = +35.9 mm. | $t_1$ = 5.8 mm. |
|   |       |      | $R_2$ = −1740.0   | $S_1$ = 4.7 |
| II | 1.572 | 42.5 | $R_3$ = −46.5 | $t_2$ = 1.6 |
|    |       |      | $R_4$ = +39.2 | $S_2$ = 5.9 |
| III | 1.611 | 58.8 | $R_5$ = ∞ | $t_3$ = 2.8 |
|     |       |      | $R_6$ = −35.1 | BF = 89.2 |
MAX REISS
*INVENTOR*
BY Newton M. Perrins
F. M. Emerson Holmes
*ATTY & AG'T*

Patented Nov. 13, 1945

2,388,869

UNITED STATES PATENT OFFICE 2,388,869

PHOTOGRAPHIC OBJECTIVE

Max Reiss, Rochester, N. Y., assignor to Eastman Kodak Company, Rochester, N. Y., a corporation of New Jersey Application September 12, 1944, Serial No. 553,697

5 Claims. (Cl. 88—57)

This invention relates to photographic objectives.

It is an object of the invention to provide an objective which is inexpensive to make and mount and which covers upwards of 27° from the axis with reduced astigmatism and corrected curvature of field, spherical aberration, and coma.

It is an ancillary object of the invention to provide an airspaced triplet objective which is corrected for coma in conjunction with a diaphragm behind the rear component.

In inexpensive cameras such as box cameras it is usual to provide a meniscus achromat or simple lens concave toward the diaphragm. It is known to optical designers and can be demonstrated mathematically that this usual type of lens cannot have a flat field without very bad astigmatism and have considerable spherical aberration.

According to the present invention, an objective consisting of three simple lens elements axially spaced and aligned is corrected for spherical aberration and curvature of field and substantially corrected for astigmatism by having the middle element biconcave and rather nearly equiconcave, its front surface being between 0.7 and 1.5 and preferably less than 0.95 times as strongly curved as it rear surface, and with a focal length between 0.3 F and 0.5 F where F is the focal length of the objective and by having the two outer elements positive with refractive indices between 0.001 and 0.10 greater than that of the biconcave element and with focal lengths between 0.5 F and 0.7 F and so shaped that their outer surfaces are numerically at least 10 times as strongly curved as their inner surfaces.

Preferably the refractive index of the biconcave element is between 1.55 and 1.65, and for achromatism its dispersive index should be less than 80 per cent of that of the positive elements.

An objective having these characteristics is corrected for coma in conjunction with a diaphragm located less than 0.1 F behind the rear element. It is advantageous in this arrangement to have short airspaces, preferably the sum of the two airspaces should be less than 0.14 F in order to avoid excessive vignetting at the corners of the image frame or excessively large lens diameters.

Objectives according to the invention are very inexpensive to make and mount because of the weak curvatures involved which do not require extremely accurate centering. The preferred form in which the whole objective lies in front of the diaphragm is particularly inexpensive to mount.

As compared with the usual inexpensive lens, the curvature of field, astigmatism and lateral color, spherical aberration, coma and distortion are greatly improved.

The accompanying drawing shows an objective according to the invention and numerical specifications for one embodiment thereof. These specifications are as follows:

EF = 100 mm.   f/8

| Lens | N | V | Radii | Thicknesses |
|---|---|---|---|---|
| I | 1.611 | 58.8 | $R_1 = +35.9$ mm. | $t_1 = 5.8$ mm. |
|   |       |      | $R_2 = -1740$     | $s_1 = 4.7$ |
| II | 1.572 | 42.5 | $R_3 = -46.5$    | $t_2 = 1.6$ |
|   |       |      | $R_4 = +39.2$     | $s_2 = 5.9$ |
| III | 1.611 | 58.8 | $R_5 = \infty$   | $t_3 = 2.8$ |
|   |       |      | $R_6 = -35.1$     | $BF = 89.2$ |

A second example is as follows:

EF = 100 mm.   f/8

| Lens | N | V | Radii | Thicknesses |
|---|---|---|---|---|
| I | 1.611 | 58.8 | $R_1 = +32.9$ mm. | $t_1 = 5.5$ mm. |
|   |       |      | $R_2 = -1604$     | $s_1 = 4.5$ |
| II | 1.605 | 38.0 | $R_3 = -45.7$    | $t_2 = 1.5$ |
|   |       |      | $R_4 = +35.0$     | $s_2 = 5.6$ |
| III | 1.611 | 58.8 | $R_5 = \infty$   | $t_3 = 2.7$ |
|   |       |      | $R_6 = -32.2$     | $BF = 89.5$ |

These specifications are given in a conventional manner. The lens elements are listed from front to rear, the refractive index N is given for the D line of the spectrum, and the radii are given as positive or negative according as the surfaces are convex or concave to the incident light.

The first example is designed for use with a diaphragm about 5 or 6 mm. behind the rear vertex, and the second example with a diaphragm at a distance of about 2 mm.

These objectives may conveniently be focused by moving the front element only and are particularly suitable for this arrangement because with such weak surface powers, there is very little adverse effect upon the aberrations when the front component is moved.

These examples embody all the features of the invention, as is shown by the following chart and by the above tables:

|  | Example I | Example II |
|---|---|---|
| *Lens I* | | |
| Focal length | .56 F | 51 F |
| $R_2/R_1$ | 48 | 48 |
| $N_I - N_{II}$ | .039 | .006 |
| *Lens II* | | |
| Focal length | .36 F | .31 F |
| $R_4/R_3$ | .84 | .77 |
| *Lens III* | | |
| Focal length | .56 F | .52 F |
| $R_7/R_5$ | $\infty$ | $\infty$ |
| $N_{III} - N_{II}$ | .039 | .006 |

It will also be noted that the front element has the largest diameter and the rear element the smallest, to aid in reducing vignetting.

I claim:

1. A photographic objective consisting of three simple lens elements axially spaced and aligned in which the middle element is biconcave with its front surface between 0.70 and 1.5 times as strongly curved as its rear surface and has a focal length between 0.3 F and 0.5 F where F is the focal length of the objective and in which the two outer elements are positive, have refractive indices greater than that of the biconcave element, have focal lengths between 0.5 F and 0.7 F, and are so shaped that their outer surfaces are numerically at least 10 times as strongly curved as their respective inner surfaces, the sum of the two airspaces being less than 0.14 F.

2. An objective according to claim 1 in which the refractive index of the negative element is between 1.55 and 1.65.

3. An objective according to claim 1 which is provided with a diaphragm located behind the rear element.

4. An objective according to claim 1 in which each airspace is between 0.5 and 2.0 times the other airspace.

5. An objective consisting of a biconcave element with refractive index between 1.57 and 1.61 aligned between two positive elements with refractive indices greater than that of the biconcave element and between 1.60 and 1.62, the dispersive index of the biconcave element being less than 0.8 times that of the positive elements in which the radii R, thicknesses $t$, and air spaces $s$, each numbered consecutively from front to rear lie between the limits shown in the following table:

| | |
|---|---|
| $0.32\ F < +R_1 < 0.37\ F$ | $0.04\ F < t_1 < 0.09\ F$ |
| $10\ F\ < -R_2 < \infty$ | $0.03\ F < s_1 < 0.07\ F$ |
| $0.44\ F < -R_3 < 0.48\ F$ | $0.01\ F < t_2 < 0.03\ F$ |
| $0.34\ F < +R_4 < 0.40\ F$ | $0.04\ F < s_2 < 0.10\ F$ |
| $15\ F\ < \pm R_5$ | $0.02\ F < t_3 < 0.05\ F$ |
| $0.31\ F < -R_6 < 0.36\ F$ | | where F is the focal length of the objective and where the + and − signs correspond to surfaces that are respectively convex or concave to the front.

MAX REISS.